United States Patent [19]
Robertson

[11] 3,789,941
[45] Feb. 5, 1974

[54] TRANSPORTERS

[75] Inventor: Roderick Robertson, Ross, Scotland

[73] Assignees: George Robertson; Kenneth Robertson; Roderick Robinson; William Berkeley, all of Tain, Ross-shire, Scotland

[22] Filed: Mar. 29, 1971

[21] Appl. No.: 128,762

[52] U.S. Cl.................. 180/9.22, 305/9, 180/9.64
[51] Int. Cl............................................ B62d 55/00
[58] Field of Search........ 180/5, 9.22; 305/35 EB, 9

[56] References Cited
UNITED STATES PATENTS

| | | | |
|---|---|---|---|
| 2,887,343 | 5/1959 | West............................... | 180/9.22 X |
| 3,011,576 | 12/1961 | Howes......................... | 305/35 EB X |
| 3,295,622 | 1/1967 | Pitchford.......................... | 180/9.22 |
| 3,338,325 | 8/1967 | Morse.......................... | 305/35 EB X |
| 3,362,492 | 1/1968 | Hansen............................. | 180/5 R |

*Primary Examiner*—Richard J. Johnson
*Attorney, Agent, or Firm*—Hauke, Gifford & Patalidis

[57] ABSTRACT

The invention is concerned with a pedestrian-controlled transporter. The transporter is arranged to traverse the ground on a motor-driven endless track upon which a load-carrying structure is supported, the transporter being controlled by the pedestrian through suitable located manual controls.

10 Claims, 5 Drawing Figures

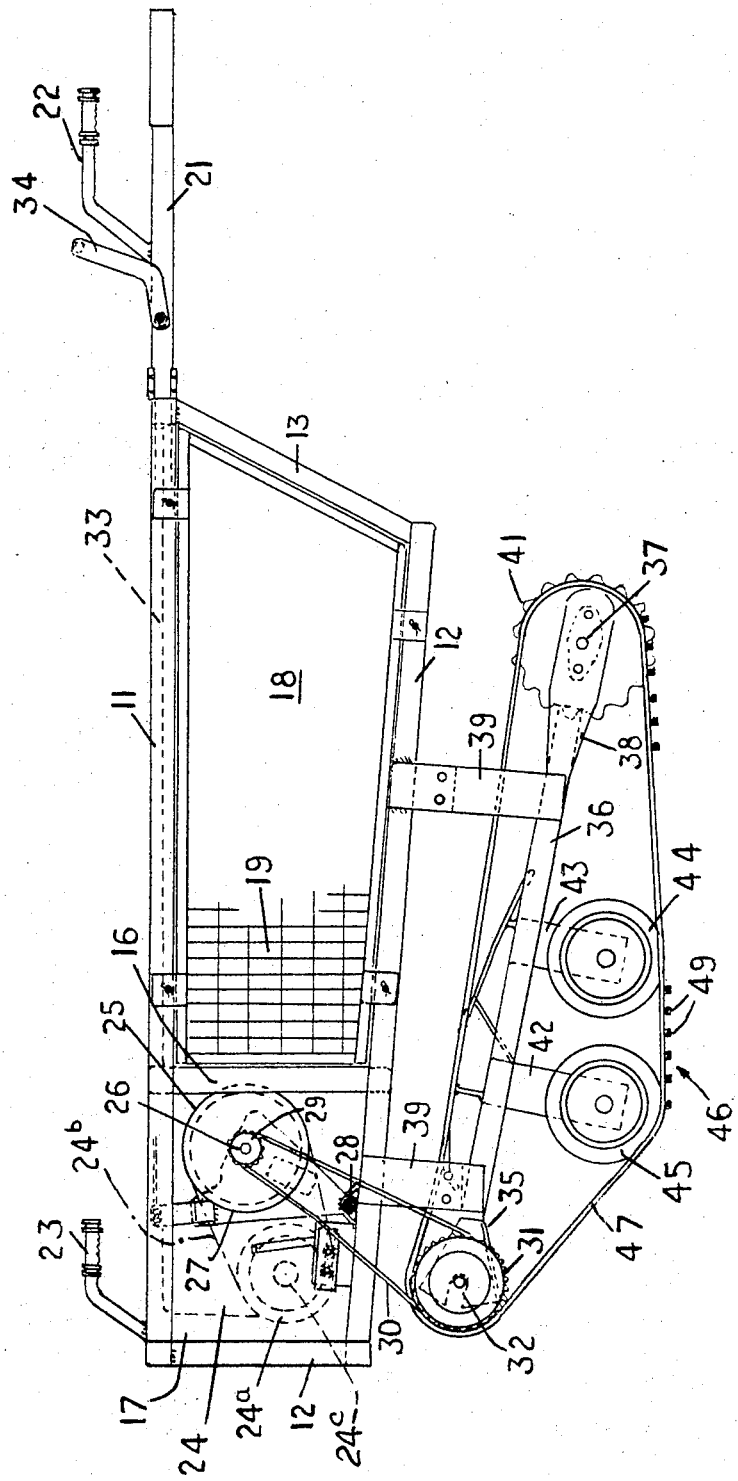

TRANSPORTERS

BACKGROUND OF THE INVENTION

This invention relates to a pedestrian controlled transporter for the carrying of loads of various types.

In many instances, particularly where ground surface is rough or uneven, manually-operated, pedestrian-controlled wheeled barrows cannot be employed with advantage. Similarly the terrian is very often unsuitable for the employment of large, engine driven vehicles, the use of which in any event may be totally uneconomic for the purpose required.

An object of the present invention is to provide a simple, efficient load-carrying transporter vehicle which is inexpensive to operate and can be controlled by a single pedestrian operator over relatively uneven ground.

According to the present invention there is provided a pedestrian-controlled transporter comprising ground-traversing endless track means, a drive unit for transmitting a drive to the track means, a load-carrying means on said transporter and control means operable by a pedestrian operator for controlling actuation of the transporter.

DESCRIPTION OF THE DRAWINGS

An embodiment of the invention will now be described, by way of example, with reference to the accompanying drawings in which:

FIG. 5 is a side elevation of the transporter from the other side thereof.

DESCRIPTION OF A PREFERRED EMBODIMENT

Figure 1:
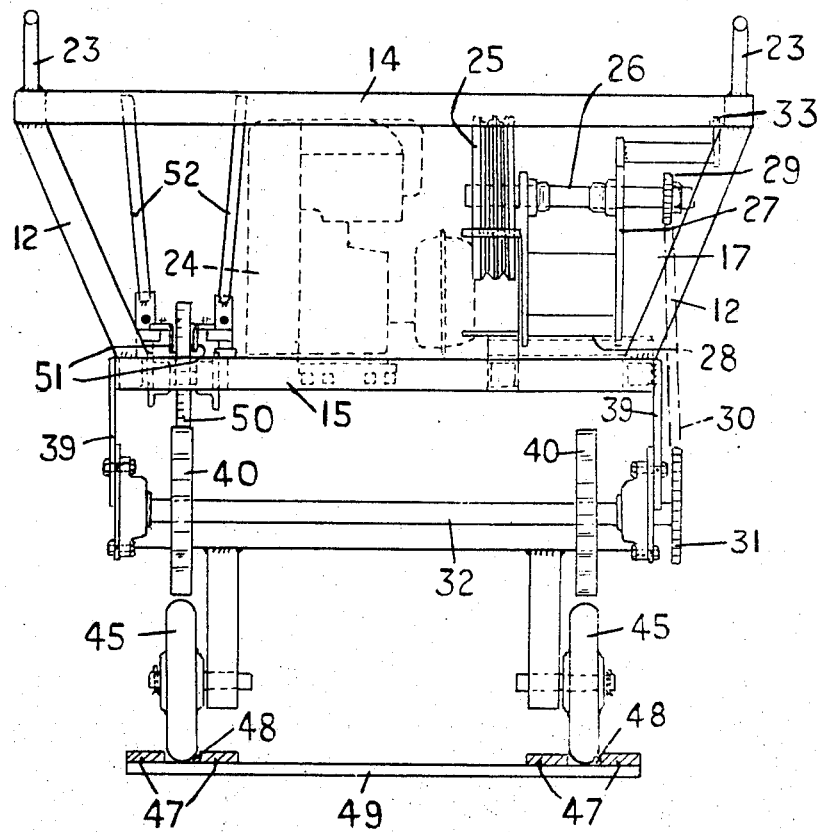
FIG. 1 is a front elevation of a vehicle transporter with a portion of the track removed for the purpose of clarity.
Figure 2:
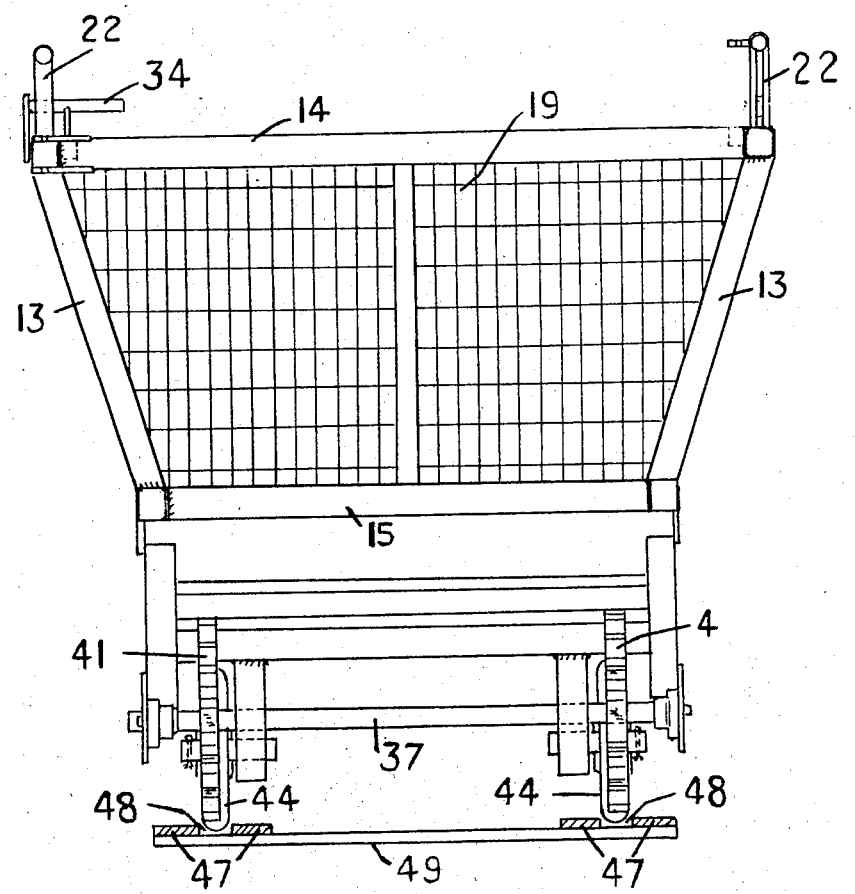
FIG. 2 is a rear elevation of the transporter with a portion of the track removed for the purpose of clarity.
Figure 3:
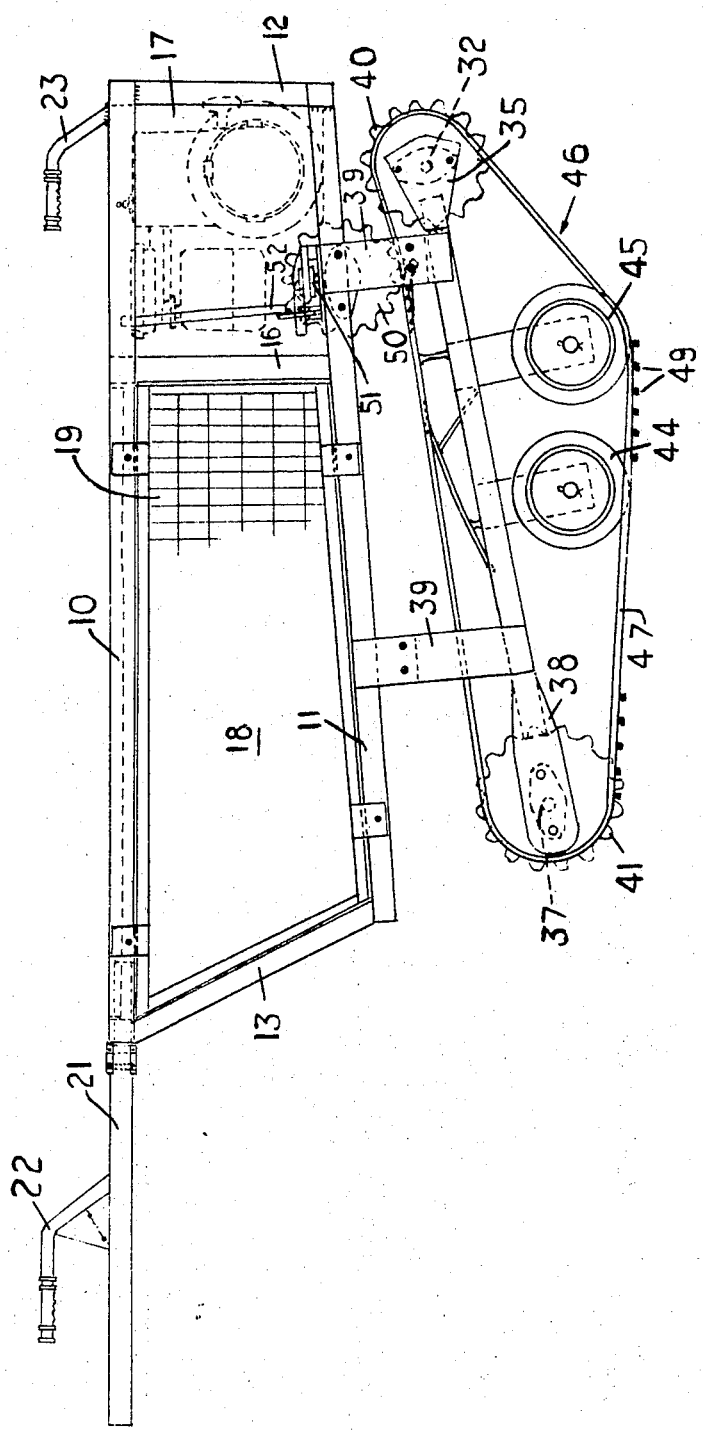
FIG. 3 is a side elevation of the transporter from one side thereof.
Figure 4:
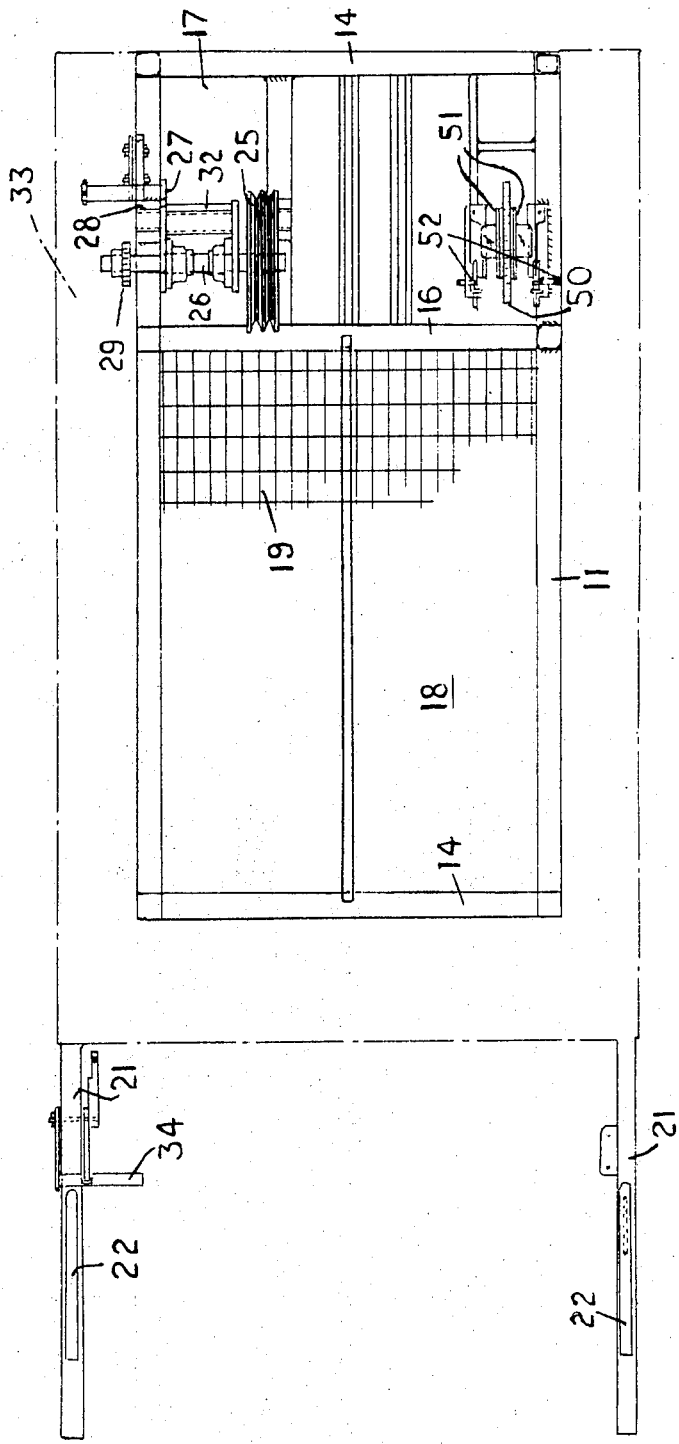
FIG. 4 is a plan view of the transporter.

Referring to the drawings, a transporter in the form of a motorized, pedestrian-controlled barrow comprises a main box-frame consisting of upper and lower side frame members 10, 11 respectively, interconnected by front and rear upright frame members 12, 13 and upper and lower transverse frame members 14, 15. Intermediate frame members 16 divide the box-frame into a forward compartment 17 containing the drive gear for the transporter and an open-topped rear compartment 18 enclosed on the base, sides and rear with wire mesh panels 19 to provide an enclosed load-carrying compartment. The forward wall of the compartment 18, which partitions the latter compartment from the compartment 17 is of metal sheet.

Rearward extensions 21 of the upper frame members 10 are provided with manual control handles 22 and auxiliary handles 23 are also provided on the front end of the frame members 10 to facilitate maneuvering of the transporter by a second operator, should this be necessary, e.g. over particularly difficult ground.

Located within the forward compartment 17, as can best be seen in FIG. 5, a motor 24 has a drive shaft 24c on the free end of which is carried a double-V 4 inch pulley 24a from which a pair of V-belts 24b extend round an 8 inch pulley 25 carried on the inner end of a counter shaft 26 which is mounted on a bracket 27 and which is angularly pivotal about axis 28. At the outer end of the counter shaft 26 is chain sprocket 29 which is interconnected by a chain 30 to a co-operating 6 inch diameter sprocket 31 carried at the outer end of a track drive shaft 32.

Angular movement of the bracket 27 is controlled by a metal cable rod 33 connected at one end to the bracket 27 and extending through one of the upper frame members 10 to a control lever 34 provided adjacent one of the handles of the transporter. Angular movement of the counter shaft 26 on the bracket 27 effectively forms a clutch mechanism so that by actuation of the lever 34, the shaft 26 is angularly pivoted about the axis 28 thereby shortening the distance between pulley 25 and the co-operating V-belt pulley on the engine drive shaft. The V-belts connecting the pulleys are thereby slackened sufficiently for the belt drive to be cut off until the clutch is again engaged by movement of the lever 34 in the reverse direction to tension the V-belts. It should be noted that when the clutch mechanism is engaged and the drive shaft 32 is being driven, the axis of shaft 32, axis 28 and axis of counter shaft 26 are in alignment thereby ensuring satisfactory chain tension.

The track drive shaft 32 is carried in the slotted front fork 35 of a rectangular track frame 36 and an idler shaft 37 is carried in a rear fork 38 of the frame 36. The frame 35 is fixedly connected beneath the main box frame by means of depending struts 39. Adjacent each end of the drive shaft 32 are sprockets 40 (not shown in FIG. 5) of 9¼ inches diameter × 1 inch and incorporating 16 teeth at 1.82 inch pitch and adjacent each end of idler shaft 37 are sprockets 41 of 8 inch diameter × 1 inch and incorporating 14 teeth at 1.65 inch pitch. Rotatably mounted on brackets 42, 43 at each side of the transporter are two idler rollers 44, 45 (which may be spring loaded) constituted by solid rubber tire wheels 8 inch diameter × 2 inches and around the sprockets 40, 41 and rollers 44, 45 extends an endless track indicated generally by the reference numeral 46.

The track 46 has at each side thereof a pair of 6 ply rubber canvas or nylon belts 47 each 10 feet × 2 inches wide and laterally spaced from each other to leave a gap 48 of 1½ inch therebetween. Extending transversely to the two pairs of belts 47 and secured thereto by means of rivets connected to a braking plate are 72 steel cross bars 49 each 25" × 9/16" × 9/16". The bars 48 are secured to the belts 47 at 1 7/16" centres and the sprockets 40, 41 and rollers 44, 45 run in the gap 48 between the pairs of belts 47 so that lateral movement of the track 46 is prevented and the belt is driven by the engagement of the drive sprockets 40 with bars 49.

Located on that side of the transporter remote form the clutch mechanism is a brake mechanism. The brake mechanism consists of a brake sprocket 50 positioned rearwardly of the drive sprockets 40 and on the other face of the track 46 but meshing with the bars 49 of the track. A pair of spring-loaded brake blocks 51 are arranged to engage each lateral face of the brake sprocket 50 on diverging movement of a pair of bell-crank levers 52, movement of which is controlled by a cable (not shown) connected to a brake lever adjacent a handle of the transporter.

In operation of the transporter, the engine is merely started and the transporter travels on its track 46 under the control of engine speed which in turn is throttlecontrolled by cable control in well-known manner from one handle at the rear of the transporter.

If it is desired to disengage the engine temporarily, the clutch mechanism is actuated to pivot the counter shaft 26 and its associated pulley 25, thereby slackening the V-belts sufficiently to cut off the drive to the track 46.

It will readily be appreciated that various modifications can be made to the transporter without departing from the inventive concept. For example the load-carrying portion need not be a basket-type compartment 20 as described above. The load-carrying portion can be of any desired form such as merely a flat platform if the transporter is used as a stretcher bearer in mountain rescue operations.

Also the various dimensions of the transporter can be varied as desired to suit individual requirements as can the location, form and incorporation of the various above-described hand controls.

What is claimed is:

1. A pedestrian-controlled transporter comprising load-carrying means; a drive unit for the transporter; manually operable control means for controlling action of the drive unit; a drive shaft and a first sprocket means located on the drive shaft and drivable by the drive unit; an idler shaft and a second sprocket means located on the idler shaft and spaced from the drive shaft towards the other end of the transporter; an endless track in drivable engagement with said first and second sprocket means; said track comprising a plurality of spaced, transversely extending track bars; said drive unit comprising a power source, a power output shaft, a pulley carried by the power output shaft, a counter shaft angularly movable about a predetermined axis, a pulley on said counter shaft, a drive belt extending between the pulley on the power output shaft and the pulley on the counter shaft, means for transmitting the drive from the counter shaft to the track means, and a manually controlled clutch mechanism operable to effect angular movement of the counter shaft about its predetermined axis so as to decrease the distance between the pulleys on the counter shaft and the power shaft to an extent to slacken the drive belt whereby the drive to the counter shaft is reduced, the axis of the drive shaft being located forward of and parallel to but on a higher horizontal plane than the idler shaft; and a brake sprocket in mesh with the track bars and manually controlled brake blocks selectively engageable with the side faces of the brake sprocket to effect braking of the track.

2. A transporter as claimed in claim 1, in which the brake blocks are each mounted on a pair of cable-controlled bell-crank levers.

3. A pedestrian-controlled transporter comprising load-carrying means; a drive unit for the transporter; manually operable control means for controlling actuation of the drive unit; first sprocket means located on a drive shaft drivable by the drive unit; second sprocket means spaced from the drive shaft towards the other end of the transporter; an endless track in drivable engagement with said first and second sprocket means; said track comprising a plurality of spaced transversely extending track bars wherein the improvement consists in that there is provided a brake sprocket in mesh with the track bars and manually controlled brake blocks selectively engageable with the side faces of the brake sprocket to effect braking of the track.

4. An endless track for a transporter as claimed in claim 3, wherein the track bars of the track are interconnected by a pair of parallel endless belts adjacent each side of the track, the belts of each pair being spaced laterally from each other to define a path or gap therebetween.

5. A transporter as claimed in claim 3, in which the axis of the drive shaft is located forward of and parallel to but on a higher horizontal plane than the idler shaft.

6. A transporter as claimed in claim 5, in which at least one pair of idler rollers is located in engagement with the track and intermediate the drive shaft and the idler shaft.

7. A transporter as claimed in claim 3 comprising a pair of cable controlled bell crank levers on which each of the brake blocks are mounted.

8. A transporter as claimed in claim 3 in which the drive unit comprises a power source, a power output shaft, a pulley carried by the output shaft, a counter shaft angularly movable about a predetermined axis, a pulley on said counter shaft, a drive belt means extending between the pulley on the power output shaft and the pulley on the counter shaft, means for transmitting the drive from the counter shaft to the track means and a manually controlled clutch mechanism operable to effect angular movement of the counter shaft about its predetermined axis so as to decrease the distance between the pulley on the counter shaft and the power output shaft to an extent sufficient to slacken the drive belt means whereby the drive to the counter shaft is reduced or cut off.

9. A transporter as claimed in claim 8, in which the counter shaft is carried by a bracket pivotable about said axis, and the manual control for the clutch mechanism comprises a manually operable cable connected to the bracket.

10. A transporter as claimed in claim 9, in which the drive from the counter shaft to the track means comprises a chain, sprockets on the counter shaft and the track drive shaft around which the chain passes, and the axes of said shafts and the pivotal axis of the counter shaft being substantially in alignment when the drive belt is tensioned so that chain tension is maintained.

* * * * *

UNITED STATES PATENT OFFICE
CERTIFICATE OF CORRECTION

Patent No. 3,789,941           Dated February 5, 1974

Inventor(s)  Roderick Robertson

It is certified that error appears in the above-identified patent and that said Letters Patent are hereby corrected as shown below:

Column 2, line 46, delete "braking" and insert --backing--

Column 2, line 54, delete "form" and insert --from--

Column 4, line 8, after "sprocket" insert --between said first and second sprocket means on the outer surface of the track--

Signed and sealed this 21st day of May 1974.

(SEAL)
Attest:

EDWARD M. FLETCHER, JR.
Attesting Officer

J. MARSHALL DANN
Commissioner of Patents